United States Patent
Lee et al.

(10) Patent No.: US 8,953,896 B2
(45) Date of Patent: Feb. 10, 2015

(54) METHOD AND APPARATUS FOR ENHANCING IMAGE QUALITY USING SPATIAL MODULATION PER BAND

(75) Inventors: Hyun-seung Lee, Seoul (KR); Dong-hyun Kim, Suwon-si (KR); Se-hyeok Park, Seoul (KR); Jong-hyun Park, Seoul (KR); Gun-shik Shin, Suwon-si (KR); Youn-jin Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 829 days.

(21) Appl. No.: 13/181,824

(22) Filed: Jul. 13, 2011

(65) Prior Publication Data

US 2012/0014616 A1 Jan. 19, 2012

Related U.S. Application Data

(60) Provisional application No. 61/363,779, filed on Jul. 13, 2010.

(30) Foreign Application Priority Data

Jun. 7, 2011 (KR) .................. 10-2011-0054643

(51) Int. Cl.
*G06K 9/00* (2006.01)
*H04N 19/33* (2014.01)

(52) U.S. Cl.
CPC .............................. *H04N 19/00436* (2013.01)
USPC ........... 382/232; 382/254; 382/263; 382/264; 382/276; 382/279

(58) Field of Classification Search
USPC .......... 382/232, 254, 263, 264, 276, 279–281
See application file for complete search history.

(56) References Cited

U.S. PATENT DOCUMENTS 7,680,356 B2 3/2010 Boyce et al.
2009/0180555 A1* 7/2009 Sun et al. ................. 375/240.29

* cited by examiner

*Primary Examiner* — Wesley Tucker
(74) *Attorney, Agent, or Firm* — Sughrue Mion, PLLC (57) ABSTRACT

A method and apparatus for enhancing and improving image quality are provided. The method includes separating an input image into at least one low frequency component and at least one high frequency component; modulating the low frequency components in a block unit by dithering; modulating the high frequency components by sampling; and combining the modulated low frequency components and the modulated high frequency components.

26 Claims, 3 Drawing Sheets

METHOD AND APPARATUS FOR ENHANCING IMAGE QUALITY USING SPATIAL MODULATION PER BAND

CROSS-REFERENCE TO RELATED PATENT APPLICATIONS

This application claims priority from Korean Patent Application No. 10-2011-0054643, filed on Jun. 7, 2011 in the Korean Intellectual Property Office, and U.S. Provisional Application No. 61/363,779, filed on Jul. 13, 2010, the disclosures of which are incorporated herein in their entirety by reference.

BACKGROUND

1. Field

Methods and apparatuses consistent with the exemplary embodiments relate to the improvement and enhancement of image quality.

2. Description of the Related Art

A frequency component of an image may be lost during image compression or scaling. If an image component of a predetermined frequency band is lost, fine quality of the image is reduced, and the image becomes extremely coarse or plain, and thus image quality may visually deteriorate.

An image processing method of amplifying an image component of a weak frequency band is used to improve the quality of the deteriorated image. However, if a high frequency component of the image is amplified by using the image processing method, an overall sharpness of the image is enhanced, the lost high frequency component of the image is not recovered, and thus it is difficult to recover the fine quality of an original image.

SUMMARY

One or more exemplary embodiments provide methods and apparatuses for enhancing and improving image equality by modulating an image component for a low frequency band and a high frequency band of the image.

According to an aspect of an exemplary embodiment, there is provided a method of enhancing image quality, the method including: separating an input image into low frequency components and high frequency components; modulating the low frequency components in a block unit by dithering; modulating the high frequency components by sampling; and combining the modulated low frequency components and the modulated high frequency components.

The modulating of the low frequency component may include: determining a similarity between a current block and a neighboring block among the low frequency components of the input image; and determining whether to combine the current block and random values based on the similarity between the current block and the neighboring block.

The modulating of the high frequency components may include: performing a de-blurring operation on the high frequency components; performing a sampling operation on the high frequency components having a reduced blurry component due to the de-blurring operation, selecting and combining pixels at predetermined positions from among neighboring pixels within a predetermined range with respect to a current pixel with respect to pixels of the high frequency component, and determining a sampling value for the current pixel.

According to an aspect of another exemplary embodiment, there is provided an apparatus for enhancing image quality, the apparatus including: a frequency separation unit for separating an input image into low frequency components and high frequency components; a low frequency modulation unit for modulating the low frequency components in a block unit by dithering; a high frequency modulation unit for modulating the high frequency components by sampling; and a frequency combination unit for combining the modulated low frequency components and the modulated high frequency components.

The apparatus may further include: a temporal combination unit for generating a current modulation image by combining the modulated low frequency components and the modulated high frequency components with respect to the current image, and combining a modulation image of a previous image and the current modulation image.

According to an aspect of another exemplary embodiment, there is provided computer readable recording medium having embodied thereon a program for executing the method of enhancing image quality.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Hereinafter, exemplary embodiments will be described in detail with reference to the attached drawings.

Figure 1:
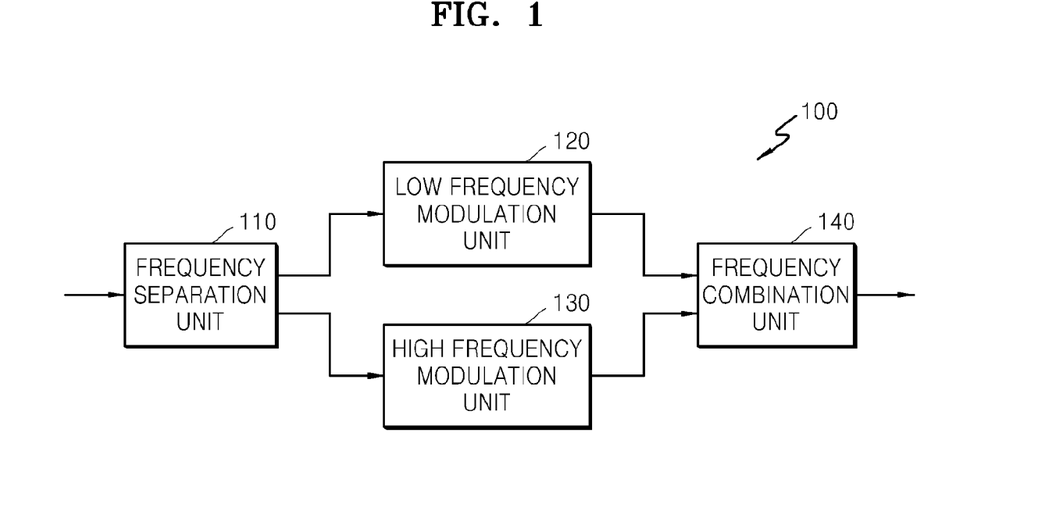
FIG. 1 is a block diagram illustrating an apparatus for enhancing image quality, according to an exemplary embodiment.

FIG. 1 is a block diagram illustrating an apparatus 100 for enhancing image quality, according to an exemplary embodiment. Referring to FIG. 1, the apparatus 100 for enhancing image quality receives an image sequence, such as video data, modulates an input image for a low frequency band and a high frequency band, and enhances the video quality.

The apparatus 100 for enhancing image quality includes a frequency separation unit 110, a low frequency modulation unit 120, a high frequency modulation unit 130, and a frequency combination unit 140. The apparatus 100 for enhancing image quality may include a central operation processor or a graphic processor (not shown) to control operations of the frequency separation unit 110, the low frequency modulation unit 120, the high frequency modulation unit 130, and the frequency combination unit 140. The frequency separation unit 110, the low frequency modulation unit 120, the high frequency modulation unit 130, or the frequency combination unit 140 may include an operation processor and be implemented by the operation processor.

The frequency separation unit 110 separates the input image into a low frequency component and a high frequency component.

The low frequency modulation unit 120 modulates a low frequency component of the input image separated by the frequency separation unit 110 by dithering. The low frequency modulation unit 120 dithers the low frequency component of the input image in a block unit. The low frequency modulation unit 120 modulates a low frequency block based on the low frequency component in a spatial domain.

The modulation performed by the low frequency modulation unit 120 may determine a low frequency modulation component in the block unit based on the low frequency component of the input image. For example, the low frequency modulation unit 120 may modulate the low frequency block. The low frequency block may be one of blocks of the low frequency image including low frequency components of the input image. Alternatively, the low frequency modulation unit 120 may receive blocks of the input image, extract a low frequency component of each block, and use a low frequency block including the low frequency component of each block to modulate a low frequency component for a current block.

The low frequency modulation unit 120 may combine the current block and a random value based on the similarity between the current block of the low frequency component and at least one neighboring block of the input image.

The low frequency modulation unit 120 may determine the similarity between a current low frequency block and at least one neighboring low frequency block of the input image. The low frequency modulation unit 120 may determine whether to combine the current low frequency block and the random value based on the similarity between the current low frequency block and neighboring low frequency block.

If the current low frequency block of the input image and neighboring low frequency blocks are quite similar to each other, the low frequency modulation unit 120 determines that image quality is lost and that the current low frequency block and neighboring low frequency block are extremely planar regions, combines the low frequency component of the current low frequency block and the random value, and recovers the image quality.

For example, if the current low frequency block and the at least one neighboring low frequency block are similar to each other, the low frequency modulation unit 120 may combine the current low frequency block and the random value. Independently generated random numbers may be combined with low frequency components of the current low frequency block. That is, if the current low frequency block and neighboring low frequency blocks are similar to each other, a current low frequency modulation component may be output by combining the random value and the current low frequency block.

On the other hand, if the current low frequency block and neighboring low frequency blocks are not similar to each other, the low frequency modulation unit 120 may output the current low frequency block as the current low frequency modulation component.

That is, if a difference between average values of low frequency components of the current low frequency block and a previous low frequency block of the input image is smaller than or equal to a predetermined threshold, the low frequency modulation unit 120 may determine the current low frequency block and the previous low frequency block as extremely planar regions. In this case, the low frequency modulation unit 120 adds a random value to the current low frequency block that is the extremely planar region, which spreads a frequency component concentrated in a low frequency band to a high frequency band, thereby leading to more natural image representation.

The high frequency modulation unit 130 modulates a high frequency component of the input image separated by the frequency modulation unit 110 through sampling. The high frequency modulation unit 130 modulates a low frequency block per pixel based on the high frequency component in the spatial domain.

The modulation performed by the high frequency modulation unit 130 may determine a high frequency modulation component based on the high frequency component of the input image per pixel. For example, the high frequency modulation unit 130 may modulate an image component of a current pixel, i.e. a current high frequency component, based on a high frequency image including high frequency components of the input image per pixel. Alternatively, the high frequency modulation unit 130 may extract the low frequency components of the input image per pixel, and modulate the current high frequency component that is the high frequency component of the current pixel.

The high frequency modulation unit 130 may perform sampling on the high frequency component per pixel of the input image for the current high frequency component, and determine a current high frequency modulation component. For example, the high frequency modulation unit 130 may select pixels at predetermined positions among neighboring high frequency pixels within a predetermined range with respect to a current high frequency pixel, combine high frequency components per pixel, determine a sampling combination value of the current high frequency component, and output the current high frequency modulation component.

The high frequency modulation unit 130 may perform de-blurring to modulate the high frequency component of the input image. The high frequency modulation unit 130 may additionally perform sampling and combining on the high frequency component having a reduced blurry component due to the de-blurring and determine the high frequency modulation component.

The frequency combination unit 140 combines the low frequency component modulated by the low frequency modulation unit 120 and the high frequency component modulated by the high frequency modulation unit 130, and outputs an image modulated by using an image quality enhancement method.

The apparatus 100 for enhancing image quality may add frequency components in a frequency band wider than an original frequency band based on independent modulations of the low frequency band and the high frequency band. Thus, components of frequency bands are dispersed in the input image that is extremely planar due to the frequency components concentrated in the low frequency band due to image expansion or deterioration, thereby recovering lost image quality.

Figure 2:
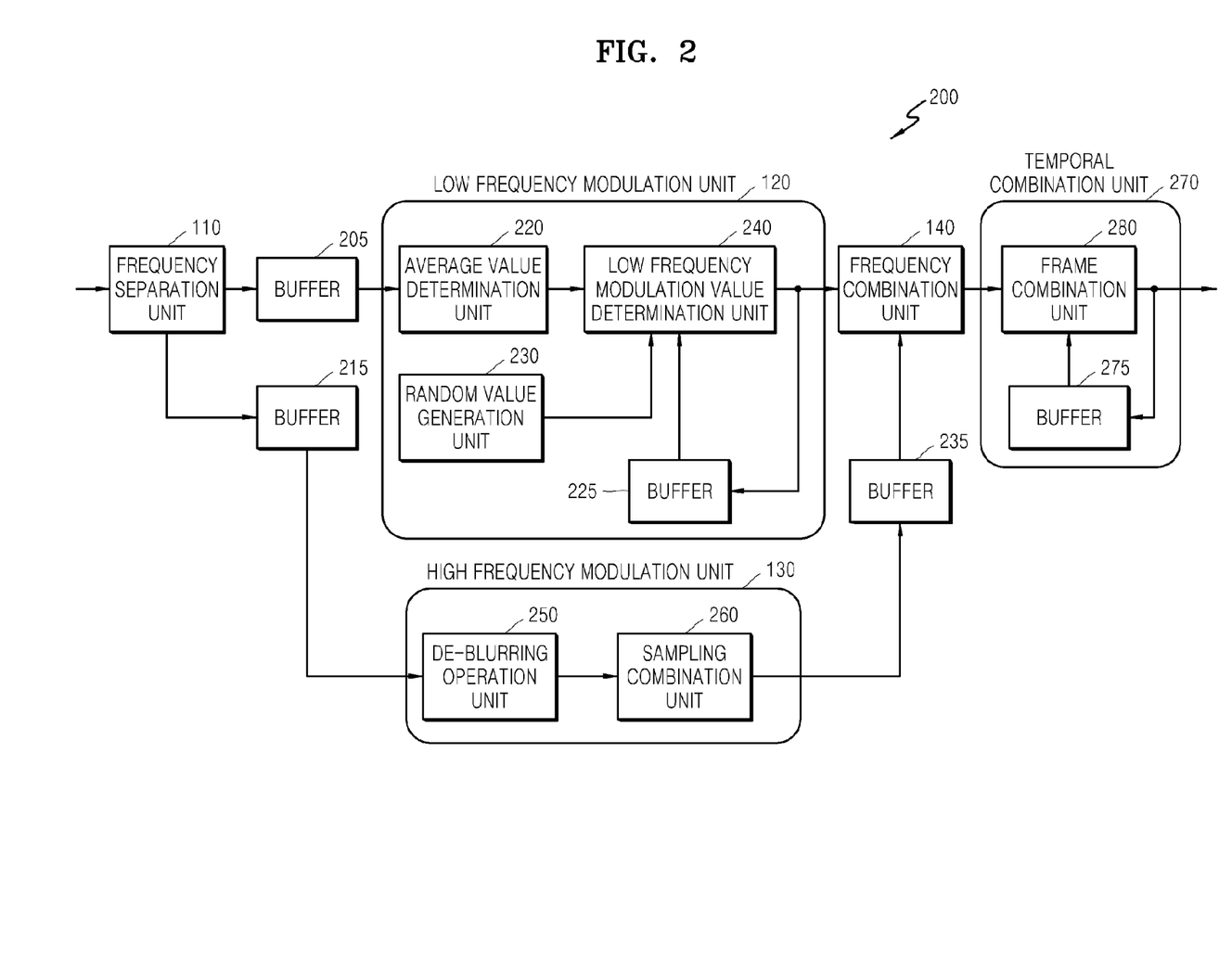
FIG. 2 is a block diagram illustrating an apparatus for enhancing image quality, according to an exemplary embodiment.

FIG. 2 is a block diagram illustrating an apparatus 200 for enhancing image quality, according to another exemplary embodiment.

Referring to FIG. 2, the apparatus 200 for enhancing image quality further includes buffers 205, 215, 225, and 235 and a temporal combination unit 270, in addition to the frequency separation unit 110, the low frequency modulation unit 120, the high frequency modulation unit 130, and the frequency combination unit 140.

The frequency separation unit 110 may separate a low frequency component and a high frequency component of an input image by using at least one of a low pass filter and a bilateral filter. The low frequency component and the high frequency component separated by the frequency separation unit 110 may be stored in the buffer 205 and the buffer 215, respectively.

The operation of the frequency separation unit 110 may be expressed according to equations 1 and 2 below, $$Y_{LF} = LPF(Y) \quad \text{[Equation 1]}$$

$$Y_{HF} = Y - LPF(Y_{LF}) \quad \text{[Equation 2]}$$

wherein Y denotes the input image, and LPF( ) denotes a low pass filtering function. According to equation 1, the low frequency component $Y_{LF}$ of the input image Y may be generated by low pass filtering the input image Y. According to equation 2, the high frequency component $Y_{HF}$ may be generated from the input image Y excluding the low frequency component $Y_{LF}$.

The low frequency modulation unit 120 may determine a low frequency modulation component of the input image by combining low frequency components of a current low frequency block and random values based on similarity between the current low frequency block and neighboring low frequency block of the input image.

More specifically, the low frequency modulation unit 120 may include an average value determination unit 220, a random value generation unit 230, a low frequency modulation value determination unit 240, and a buffer 225.

The average value determination unit 220 may receive low frequency blocks of low frequency components of the input image from the buffer 205 and determine an average value for each low frequency block. The buffer 225 may store the average value for each low frequency block determined with respect to one or more blocks determined by the average value determination unit 220. The random value generation unit 230 may generate random values.

The average value determination unit 220 may determine an average value of the current low frequency block for low frequency blocks of the input image and output the determined average value to the low frequency modulation value determination unit 240. The low frequency modulation value determination unit 240 may compare the average value of the current low frequency block and an average value of the at least one neighboring low frequency block spatially adjacent to the current low frequency block, and determine the similarity between the current low frequency block and neighboring low frequency block.

The low frequency modulation value determination unit 240 may determine whether to combine the current low frequency block and random values based on the similarity between the current low frequency block and neighboring low frequency block and output a low frequency modulation component of a current image. If the low frequency modulation value determination unit 240 determines that the current low frequency block and the at least one neighboring low frequency block are similar to each other, the frequency modulation value determination unit 240 may combine the current low frequency block and the random values generated by the random value generation unit 230. If the low frequency modulation value determination unit 240 determines that the current low frequency block and the neighboring low frequency block are not similar to each other, the frequency modulation value determination unit 240 may output the current low frequency block.

The operation of the frequency modulation value determination unit 240 may be expressed according to equation 3 below, $$Y_{LPF,n}^{B'} = \begin{cases} Y_{LFP,n}^{B} + \text{var} \cdot value_{rand}, & \text{if } |Y_{LFP,n}^{B} - Y_{LFP,n-1}^{B}| \leq th \\ Y_{LFP,n}^{B} \end{cases} \quad \text{[Equation 3]}$$

wherein $Y^{B}_{LPF,n}$ and $Y^{B}_{LPF,n-1}$ denote average values of low frequency components of an $n^{th}$ low frequency block and an $n-1^{th}$ low frequency bock of the input image Y, respectively, $Y^{B'}_{LPF,n}$ denotes a modulated low frequency value of the current $n^{th}$ low frequency block, th denotes a threshold for determining similarity between the $n^{th}$ low frequency block and the $n-1^{th}$ low frequency bock of the input image Y, $value_{rand}$ denotes random values, and var denotes a variance of random values.

More specifically, if a difference between the average values of low frequency components of the $n^{th}$ low frequency block and the $n-1^{th}$ low frequency block of the input image Y is smaller than or equal to a predetermined threshold, the low frequency modulation value determination unit 240 may add a random value that increases in proportion to the variance of random values to the low frequency component value of the current block, and output a new low frequency component value.

More specifically, if the difference between the average values of low frequency components of the $n^{th}$ low frequency block and the $n-1^{th}$ low frequency block of the input image Y is greater than the predetermined threshold, the low frequency modulation value determination unit 240 may output the frequency component value of the current block.

Therefore, the low frequency modulation component output by the low frequency modulation unit 120 may be output in a block unit, and further include an image component of a high frequency band compared to a frequency band of the current low frequency block.

The high frequency modulation unit 130 modulates the high frequency component of the input image by sampling. More specifically, the high frequency modulation unit 130 includes a de-blurring operation unit 250 and a sampling combination unit 260.

The de-blurring operation unit 250 may receive the high frequency component for each pixel of the input image, and perform de-blurring on each pixel. The sampling combination unit 260 may perform sampling on the high frequency component having a reduced blurry component due to the de-blurring performed by the de-blurring operation unit 250.

If an image expands at a high rate or extremely deteriorates, a high frequency component of the image may be damaged and thus power of signals of the image may be reduced. In this case, the high frequency component of the image may be amplified through de-blurring.

For example, the de-blurring operation unit 250 may perform de-blurring on a current high frequency component by using one or more band pass filters. The de-blurring operation unit 250 may apply one or more band pass filters to the current high frequency component, extract frequency components for frequency bands, calculate a weighted sum of the extracted frequency components for frequency bands, and combine the weighted sum with the current high frequency component.

The operation of the de-blurring operation unit 250 using band pass filtering may be expressed according to equation 4 below, $$Y_{deblur} = Y_{HF} + c_k \sum_{k=1}^{n} BPF_k(Y_{HF}) \quad \text{[Equation 4]}$$

wherein $Y_{HF}$ denotes high frequency components for pixels, $c_k$ denotes weights for bands, $BPF_k(\bullet)$ denotes n band pass filtering functions for bands, and $Y_{deblur}$ denotes a high frequency component having a reduced blurry component due to the de-blurring. That is, the weighted sum of band pass filtering for bands with respect to high frequency component per pixel of the input image is calculated, thereby implementing de-blurring.

The sampling combination unit 260 may perform sampling on the current high frequency component from which a blurry component is removed due to the de-blurring, and determine a high frequency modulation component that combines sampling values. The sampling combination unit 260 may select pixels at predetermined positions from among neighboring pixels within a predetermined range with respect to a current pixel, combine corresponding high frequency components, determine a sampling combination result on the current high frequency component, and output the current high frequency modulation component.

The sampling combination unit 260 may calculate a weighted sum of the pixels at predetermined positions selected with respect to a current pixel by using weights for predetermined positions, and determine sampling and combination results for high frequency components of the current pixel. A sampling combination operation may be expressed according to equation 5 below, $$Y'_{HPF}=SM(Y_{deblur}) \quad \text{[Equation 5]}$$

wherein SM(•) denotes a sampling and weighted sum function, and $Y'_{HPF}$ denotes a component modulated through sampling and weighted sum performed on the high frequency component $Y_{deblur}$ from which the blurry component is reduced.

For example, the sampling combination unit 260 may implement a sampling operation on the current pixel by using a sampling window of a predetermined size or a spatial finite impulse response (FIR) filter to select high frequency components of pixels positioned away from the current pixel by a specific interval.

Figure 3:
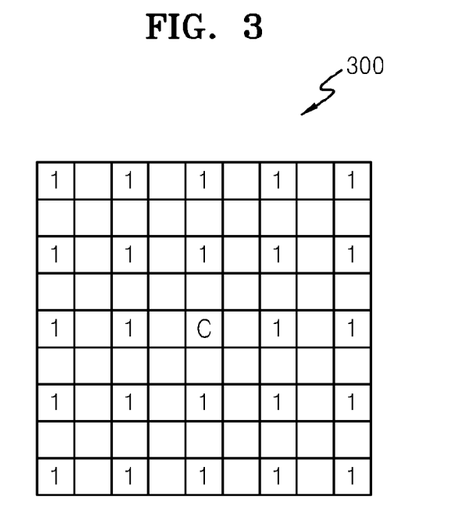
FIG. 3 illustrates a sampling window according to an exemplary embodiment.

FIG. 3 illustrates a sampling window 300 according to an exemplary embodiment. Referring to FIG. 3, the sampling window 300 that has a 9×9 size may perform sampling on every two pixels by a sampling interval of 2 pixels in four directions with respect to a current pixel. In particular, a central weight C of the sampling window 300 is a weight for the current pixel, and a weight for other sampling positions is 1. The sampling combination unit 260 may calculate a weighted sum of high frequency components of pixels of the sampling positions by using weights separately set for sampling positions of the current pixel, thereby determining a current high frequency modulation component.

In addition, the sampling combination unit 260 may determine different weights according to the sampling positions, optionally determine a size of the sampling window 300, a sampling interval, a shape of the sampling window 300, etc. and perform sampling for modulation of a current high frequency component in terms of various variables or environmental factors.

A sampling operation performed on the current pixel may search for a sampling object from neighboring pixels of the current pixel. Thus, although the sampling operation is performed on the single current pixel, the sampling combination unit 260 may receive high frequency blocks including high frequency components for neighboring pixels of the current pixel.

To input high frequency blocks for pixels with respect to the current pixel into the sampling combination unit 260, the sampling combination unit 260 may receive the high frequency components that are separated by the frequency separation unit 110 and stored in the buffer 215 in a high frequency block unit with respect to the current pixel from the de-blurring operation unit 250.

Therefore, the de-blurring operation unit 250 may receive the current high frequency block including the current pixel, and output a high frequency block from which a blurry component is removed. Then, the sampling combination unit 260 may receive the high frequency block of the current pixel from which the blurry component is removed, and output a high frequency modulation component of the current pixel.

If an image extremely expands or deteriorates, a high frequency component of the image is extremely weakened, frequency components excluding a low frequency component of an input image are concentrated in an intermediate frequency band, making the image extremely planar. An aliasing phenomenon may occur due to the sampling operation performed on the high frequency component of the input image. The aliasing phenomenon that occurs in the high frequency component of the input image may modulate frequency components concentrated in the intermediate frequency band, causing them to be dispersed to outer frequency bands.

Therefore, the frequency combination unit 140 may spatially combine the low frequency modulation component output from the low frequency modulation unit 120 and the high frequency modulation component output from the high frequency modulation unit 130. The operation of the frequency combination unit 140 may be expressed according to equation 6 below, $$Y'=Y'_{LPF}+Y'_{HPF} \quad \text{[Equation 6]}$$

wherein $Y'_{LPF}$ denotes a modulated low frequency component, and $Y'_{HPF}$ denotes a modulated high frequency component. That is, the frequency combination unit 140 may spatially combine the modulated low frequency component $Y'_{LPF}$ and the modulated high frequency component $Y'_{HPF}$, and output a modulation image Y'.

The low frequency modulation unit 120 outputs a modulation result in a block unit. The high frequency modulation unit 130 outputs a modulation result in a pixel unit and stores the modulation result in the buffer 235. The frequency combination unit 140 may receive the modulation results of the high frequency modulation unit 130 corresponding to the same positions and sizes as the modulation results of the low frequency modulation unit 120 from the buffer 235, and combine the modulated low frequency component and the modulated high frequency component.

The apparatus 200 for enhancing image quality performs an operation for enhancing image quality of input images, thereby modulating a current image by using a modulation image of a previous image in order of time.

The temporal combination unit 270 may receive a current modulation image of the current image from the frequency combination unit 140, and combine a modulation image of the previous image and the current modulation image. The final modulation image output from the temporal combination unit 270 may be stored in the buffer 175 again and used as a previous image of a next modulation image.

The temporal combination unit 270 may consider motion between the previous image and the current image to temporally combine the previous modulation image and the current modulation image. That is, the temporal combination unit 270 may determine a motion vector between the previous image and the current image, and combine the previous modulation image having compensated motion based on the motion vector and the current modulation image. The operation of the temporal combination unit 270 may be expressed according to equation 7 below, $$Y''(t)=aY'_{MC}(t-1)+(1-a)Y'(t) \quad \text{[Equation 7]}$$

wherein the modulation image of the current image Y(t) is Y'(t), the modulation image of the previous image Y(t−1) is Y'(t−1), the image having a compensated motion for the previous modulation image is $Y'_{MC}(t-1)$, and a denotes a weight of the previous modulation image, and may be modified by using various parameters.

That is, the temporal combination unit 270 may determine the final modulation image $Y''(t)$ with respect to temporal motion through a weighted sum of the previous modulation image having the compensated motion $Y'(t-1)$ and the current modulation image $Y'(t)$.

Therefore, the apparatus 200 for enhancing image quality modulates an image that is extremely planar due to an extreme expansion or deterioration of an image, by adding a new high frequency component or spreading image components for frequency bands, thereby recovering image quality that enables a viewer to feel natural image representation.

Figure 4:
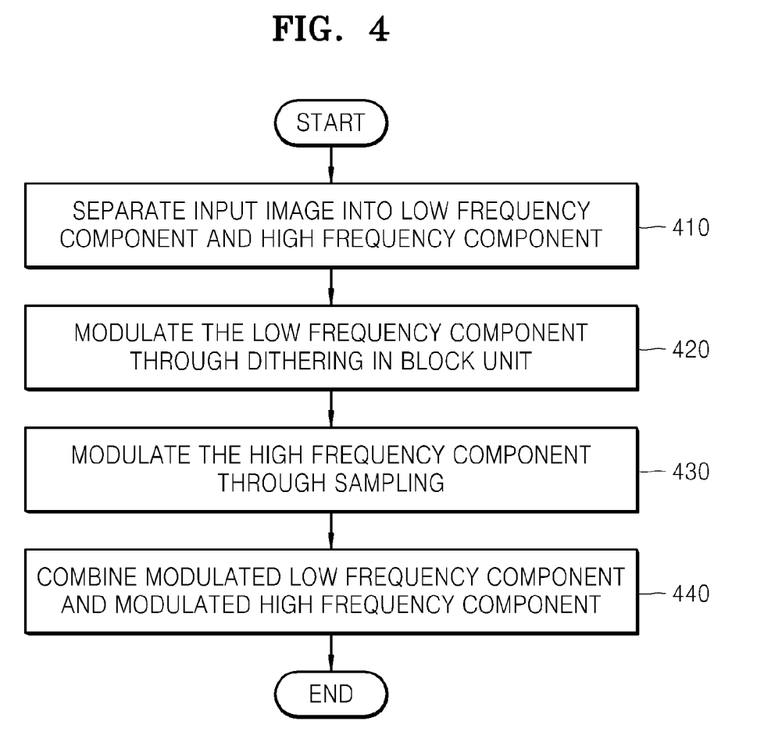
FIG. 4 is a flowchart illustrating a method of enhancing image quality, according to an exemplary embodiment.

FIG. 4 is a flowchart illustrating a method of enhancing image quality, according to an exemplary embodiment.

Referring to FIG. 4, in operation 410, an input image of video is separated into a low frequency component and a high frequency component. For example, the low frequency component and the high frequency component of the input image may be separated by low pass filtering or bilateral filtering.

In operation 420, the low frequency component of the input image is modulated by dithering in a block unit. Among low frequency blocks of the input image, the similarity between a current low frequency block and neighboring low frequency block may be determined, and, if the current low frequency block and the neighboring low frequency block are similar to each other, a random value may be added to the current low frequency block.

In operation 430, the high frequency component of the input image is modulated through sampling. Pixels at predetermined positions are selected from neighboring pixels within a predetermined range with respect to a current pixel for pixels of the input image, and high frequency components of the selected pixels are combined, and thus a sampling value of a current high frequency component may be determined. A sampling and combination method of high frequency components using the current pixel and neighboring pixels may be implemented by using at least one of a sampling window of a predetermined size and a spatial FIR filter.

A de-blurring operation may be performed on the high frequency component before a modulation value is determined by sampling, with respect to high frequency component per pixel of the input image. A blurry component is reduced due to the de-blurring operation, and a sampling operation may be further performed on an amplified high frequency component.

In operation 440, a modulation image is output by combining a low frequency modulation component and a high frequency modulation component.

The method of enhancing image quality combines a modulation image of a current image and a modulation image of a previous image in order of time, thereby outputting a final modulation image of the current image. In this case, a previous modulation image having a compensated motion and the current image may be combined in terms of a motion between the previous modulation image and the current modulation image.

The block diagrams disclosed herein may be construed by a person of ordinary skill in the art as a form conceptually expressing circuits for implementing the principles of the exemplary embodiments. Similarly, it is obvious to a person of ordinary skill in the art that a flowchart, a status transition view, a pseudo-code, or the like, may be substantially expressed in a computer-readable medium to denote various processes which can be executed by a computer or a processor whether or not the computer or the processor is clarified or not. Thus, the foregoing exemplary embodiments may be created as programs which can be executed by computers and may be implemented in a general digital computer operating the programs by using a computer-readable recording medium. The computer-readable medium may include storage mediums such as a magnetic storage medium (e.g., a ROM, a floppy disk, a hard disk, or the like), an optical reading medium (e.g., a CD-ROM, a DVD, or the like).

Functions of various elements illustrated in the drawings may be provided by the use of dedicated hardware as well as by hardware which is related to appropriate software and can execute the software. When provided by a processor, such functions may be provided by a single dedicated processor, a single shared processor, or a plurality of individual processors which can share some of the functions. Also, the stated use of terms "processor" or "controller" should not be construed to exclusively designate hardware which can execute software and may tacitly include digital signal processor (DSP) hardware, a ROM for storing software, a RAM, and a non-volatile storage device, without any limitation.

In the claims of the present application, elements expressed as units for performing particular functions may cover a certain method performing a particular function, and such elements may include a combination of circuit elements performing particular functions, or software in a certain form including firmware, microcodes, or the like, combined with appropriate circuits to perform software for performing particular functions.

Designation of 'an exemplary embodiment' and various modifications of such an expression may mean that particular features, structures, characteristics, and the like, in relation to this exemplary embodiment are included in at least one exemplary embodiment. Thus, the expression 'an exemplary embodiment' and any other modifications disclosed throughout the entirety of the disclosure may not necessarily designate the same exemplary embodiment.

In the specification, in a case of 'at least one of A and B', the expression of 'at least one among ~' is used to cover only a selection of a first option (A), only a selection of a second option (B), or a selection of both options (A and B). In another example, in a case of 'at least one of A, B, and C', the expression of 'at least one among ~' is used to cover only a selection of a first option (A), only a selection of a second option (B), only a selection of a third option (C), only a selection of the first and second options (A and B), only a selection of the second and third options (B and C), or a selection of all of the three options (A, B, and C). Even when more items are enumerated, it will be obvious to a person of ordinary skill in the art that they can be definitely extendedly construed.

While the exemplary embodiments have been particularly shown and described, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the exemplary embodiments but by the following claims, and all differences within the scope will be construed as being included in the inventive concept.

What is claimed is:

1. A method comprising:
    separating an input image into at least one low frequency component and at least one high frequency component;
    modulating the at least one low frequency component by dithering;

modulating the at least one high frequency component by sampling; and combining the at least one modulated low frequency component and the at least one modulated high frequency component.

2. The method of claim 1, wherein the modulating the at least one low frequency component comprises:

determining a similarity between a current block and a neighboring block among the at least one low frequency component of the input image; and determining whether to combine the current block and at least one random value based on the similarity between the current block and the neighboring block.

3. The method of claim 2, wherein the modulating the at least one low frequency component comprises:

determining the similarity between the current block and the neighboring block by comparing an average value of the current block and an average value of the neighboring block;

if the current block and the neighboring block are similar to each other, combining the current block and the at least one random value; and if the current block and the neighboring block are not similar to each other, outputting current low frequency components.

4. The method of claim 3, wherein the neighboring block is spatially adjacent to the current block.

5. The method of claim 1, wherein the modulating the at least one high frequency component comprises:

selecting and combining pixels at predetermined positions from among neighboring pixels within a predetermined range with respect to a current high frequency pixel; and determining a sampling value for the current high frequency pixel.

6. The method of claim 5, wherein the determining the sampling value for the current high frequency pixel comprises calculating a weighted sum of the pixels selected from the neighboring pixels within the predetermined range by using weights based on the predetermined positions.

7. The method of claim 5, wherein the determining the sampling value for the current high frequency pixel comprises determining the sampling value for the current high frequency pixel by using at least one of a sampling window of a predetermined size and a spatial finite impulse response filter.

8. The method of claim 1, wherein the modulating the at least one high frequency component comprises:

performing a de-blurring operation on the at least one high frequency component to generate at least one high frequency component having a reduced blurry component; and performing a sampling operation on the at least one high frequency component having a reduced blurry component.

9. The method of claim 8, wherein the performing the de-blurring operation comprises:

extracting one or more predetermined band frequency components by using one or more band pass filters with respect to a current high frequency component;

calculating a weighted sum of the extracted one or more predetermined band frequency components; and combining the current high frequency component and the weighted sum.

10. The method of claim 1, wherein the separating the input image into the at least one low frequency component and the at least one high frequency component comprises separating the input image into the at least one low frequency component and the at least one high frequency component by using at least one of a low pass filter and a bilateral filter.

11. The method of claim 1, further comprising:

generating a current modulation image by combining the at least one modulated low frequency component and the at least one modulated high frequency component with respect to the current image; and combining a modulation image of a previous image and the current modulation image.

12. The method of claim 11, wherein the combining the modulation image of the previous image and the current modulation image comprises:

determining a motion vector based on the previous image and the current image; and combining the current modulation image and a previous modulation image having motion that is compensated based on the motion vector.

13. The method of claim 1, wherein the modulating the at least one low frequency component comprises generating at least one modulated low frequency component in a block unit; and wherein the modulating the at least one high frequency component comprises generating at least one modulated high frequency component in a pixel unit.

14. An apparatus comprising:

a frequency separation unit that separates an input image into at least one low frequency component and at least one high frequency component;

a low frequency modulation unit that modulates the at least one low frequency component by dithering;

a high frequency modulation unit that modulates the at least one high frequency component by sampling; and a frequency combination unit that combines the at least one modulated low frequency component and the at least one modulated high frequency component.

15. The apparatus of claim 14, wherein the low frequency modulation unit modulates at least one current low frequency component of a current block by combining the at least one current low frequency component and at least one random value based on a similarity between the current block and a neighboring block among the at least one low frequency component of the input image.

16. The apparatus of claim 15, wherein the low frequency modulation unit comprises:

an average value determination unit that determines an average value of the at least one low frequency component of the current block;

a random value generation unit that generates the at least one random value; and a low frequency modulation value determination unit that determines the similarity between the current block and the neighboring block by comparing the average value of the current block and an average value of the neighboring block, and if the current block and the neighboring block are similar to each other, combines the current block and the at least one random value based on the similarity between the current block and the neighboring block, and if the current block and the neighboring block are not similar to each other, outputs the at least one current low frequency component.

17. The apparatus of claim 16, wherein the neighboring block is spatially adjacent to the current block.

18. The apparatus of claim 14, wherein the high frequency modulation unit comprises a sampling combination unit that selects and combines pixels at predetermined positions from among neighboring pixels within a predetermined range with respect to a current high frequency pixel, and determines a sampling value for the current high frequency pixel.

19. The apparatus of claim 18, wherein the sampling combination unit determines a sampling value for the current high frequency pixel by calculating a weighted sum of the pixels selected from the neighboring pixels within the predetermined range by using weights based on the predetermined positions, and determines the sampling value for the current high frequency pixel by using at least one of a sampling window of a predetermined size and a spatial FIR filter.

20. The apparatus of claim 14, wherein the high frequency modulation unit comprises a de-blurring operation unit that performs a de-blurring operation on the high frequency components to generate at least one high frequency component having a reduced blurry component,
    wherein the high frequency modulation unit performs a sampling operation on the at least one high frequency component having a reduced blurry component.

21. The apparatus of claim 20, wherein the de-blurring operation unit extracts one or more predetermined band frequency components by using one or more band pass filters with respect to a current high frequency component, calculates a weighted sum of the extracted one or more predetermined band frequency components, and combines the current high frequency component and the weighted sum.

22. The apparatus of claim 14, wherein the frequency separation unit separates the input image into the at least one low frequency component and the at least one high frequency component by using at least one of a low pass filter and a bilateral filter.

23. The apparatus of claim 14, further comprising a temporal combination unit that generates a current modulation image by combining the at least one modulated low frequency component and the at least one modulated high frequency component with respect to the current image, and combining a modulation image of a previous image and the current modulation image.

24. The apparatus of claim 23, wherein the temporal combination unit determines a motion vector based on the previous image and the current image, and combines the current modulation image and a previous modulation image having motion that is compensated based on the motion vector.

25. The apparatus of claim 14, wherein the low frequency modulation unit modulates the at least one low frequency component to generate at least one modulated low frequency component in a block unit; and
    wherein the high frequency modulation unit modulates the at least one high frequency component to generate at least one modulated high frequency component in a pixel unit.

26. A non-transitory computer readable recording medium having embodied thereon a program which, when executed by a computer, executes a method comprising:
    separating an input image into at least one low frequency component and at least one high frequency component;
    modulating the at least one low frequency component by dithering;
    modulating the at least one high frequency component by sampling; and
    combining the at least one modulated low frequency component and the at least one modulated high frequency component.

* * * * *